March 10, 1931.  A. A. THOMAS  1,795,907
THERMOSTAT
Filed April 16, 1927
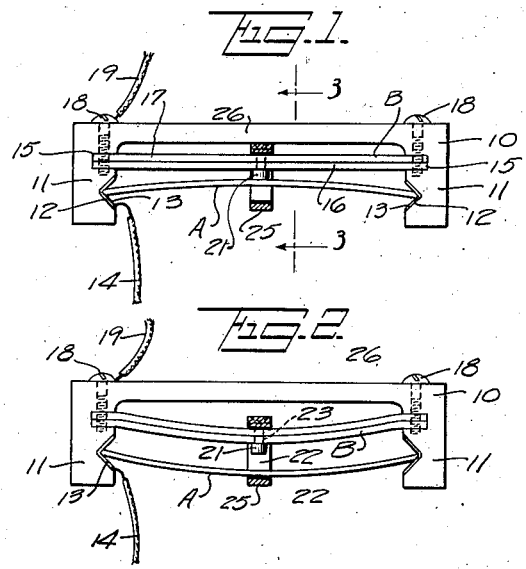
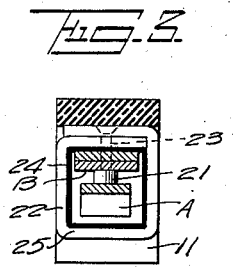
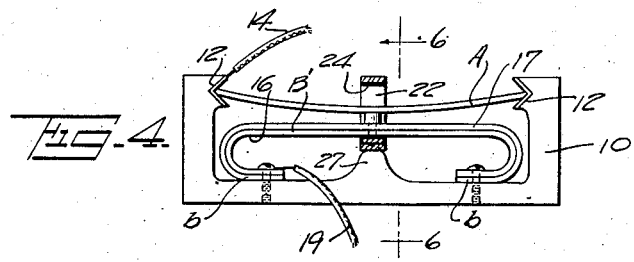
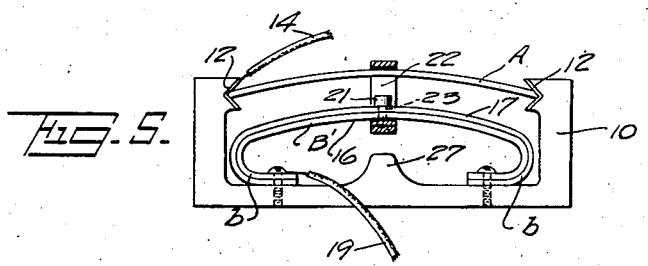
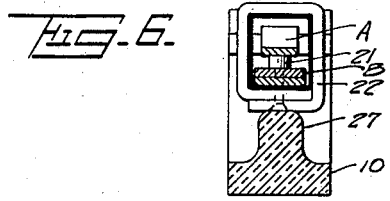
INVENTOR
Adolph A. Thomas Patented Mar. 10, 1931

1,795,907

UNITED STATES PATENT OFFICE

ADOLPH A. THOMAS, OF NEW YORK, N. Y.

THERMOSTAT

Application filed April 16, 1927. Serial No. 184,191.

This invention is for a thermostat adapted to operate with a snap action for controlling an electric circuit or performing any other useful function. My new thermostat is characterized by simplicity of construction and certainty of operation.

Briefly stated, the thermostat of my invention consists of a thermostat bar and a bowed spring member. The bar is supported at its ends and its central portion is normally in contact with the center of the spring member, which is adapted to change its shape abruptly under pressure exerted by the thermostatic movements of the bar. When the temperature of the bar reaches a predetermined high point, its pressure against the curved spring member causes the latter to snap into a position of reverse curvature out of sudden contact with the bar. A restoring connection is provided between the bar and the spring member, whereby the thermostatic movements of the bar on cooling exert pressure on the spring member until it snaps back to initial position in contact with the central portion of the bar. These snapping operations of the curved spring member by the thermostat bar may advantageously be utilized for abruptly opening and closing an electric circuit under predetermined changes of temperature of the bar.

In a preferred embodiment of my invention, the thermostat bar and bowed spring member are mounted in substantially parallel relation on a flat U-shaped frame, thereby producing a construction of unusual compactness especially adapted for use in electric heating appliances where but little space is available for mounting thermostats as in flat-irons, heating pads, percolators, and so on. The supporting frame may have a stop to prevent the thermostat bar when cooling from being carried by its own momentum out of contact with the spring member after the circuit is closed.

For the purpose of explaining my invention to persons skilled in this art, I have selected two practical embodiments for illustration in the accompanying drawings, which I shall now describe in detail. In these drawings—

Fig. 1 represents an electric thermostat constructed in accordance with my invention, the parts being shown in normal circuit-closing position;

Fig. 2 is a view similar to Fig. 1 with the bowed spring member snapped into circuit-opening position;

Fig. 3 shows a transverse cross-section on line 3—3 of Fig. 1, on an enlarged scale;

Fig. 4 illustrates a slightly modified form of thermostat, the parts being in normal circuit-closing position;

Fig. 5 is like Fig. 4, except that the bowed spring member is in a position of reverse curvature; and Fig. 6 shows an enlarged transverse cross-section on line 6—6 of Fig. 4.

Before proceeding with a detailed description of the drawings, I want to explain that the relative preparations and dimensions of the parts have been purposely exaggerated in order to make the views as clear as possible. In fact, the drawings are largely diagrammatic and are therefore not to be taken as shop drawings.

Referring to Figs. 1 and 2, there is a supporting frame indicated as a whole by 10, which in its simplest form is substantially U-shaped and may conveniently be cast or molded as a single piece of insulating material. In the legs 11 of the frame is mounted a bowed spring member A adapted to change its shape abruptly by external pressure. This spring member may be a curved leaf spring held under tension, a concave disk of elastic metal, a spring-pressed toggle, or any other form of tensioned device designed to perform the intended operation. If the member A is a spring blade, the simplest way to mount it is to insert the ends thereof in sockets or notches 12 formed in the legs 11 of frame 10. If desired, one or both of the notches 12 may have a metal lining 13, which may conveniently be used for connecting the member A in circuit as diagrammatically indicated by a conductor 14. If the spring member A is a concave disk, its periphery is supported in an annular seat on frame 10, as will be understood without additional illustration.

The supporting frame 10 is provided with a pair of aligned recesses 15 for receiving the ends of a thermostat bar B, which may be of the usual bimetallic construction consisting of a brass strip 16 and an iron strip 17 (or equivalent metals) rigidly secured together over their entire length. Bolts or screws 18 firmly hold the ends of the bar in position, and at the same time one of them serves as a binding post for a conductor 19, which leads to one side of the circuit controlled by the thermostat. To establish a good electric contact between the bar B and spring member A, either one of these parts is provided at or near the center with a contact button or projection 21. In the present instance, the contact button 21 is attached to the thermostat bar, but it can as well be fastened to the center of spring member A. The normal tension of the bowed spring member is such that it presses firmly against the contact 21, so that a good electrical connection is made between those two parts. If the supporting frame 10 is of metal, the spring A and bar B are properly insulated. Mica is one of the best insulating materials to use in surroundings subjected to great heat.

The thermostat bar B carries a bracket 22, which may conveniently be formed of a single strip or bar of metal coiled into a closed frame with overlapping ends, as best shown in Fig. 3. A single rivet 23 may be used to secure the contact button 21 and the bracket 22 on the bar B. The button 21 may simply be the head of rivet 23. The bracket 22 is suitably insulated from the thermostat bar, as by a lining 24 of asbestos, mica, or similar material. It is not necessary that the bracket 22 be insulated from the thermostat bar B; it is sufficient that the cross-piece 25 of the bracket be insulated from the spring member A when the two are in contact. It is clear that the bracket 22 may be fastened to spring member A instead of to thermostat bar B. In the broad aspect of my invention, the bracket 22 represents any practical restoring connection between the parts A and B.

The operation of the electric thermostat above described is clear from Figs. 1 and 2 to anyone familiar with electrical instruments of this type, but I may briefly explain it as follows: When the parts are in normal position, as shown in Fig. 1, the electric circuit is closed through the thermostat bar B and through the metallic spring member A. As the temperature of the thermostat bar B increases, it assumes (or tends to assume) a curved shape and presses against the center of spring member A, until the latter reaches a condition of instability from which it suddenly snaps into a position of reverse curvature out of contact with the thermostat bar, as shown in Fig. 2. This reversing movement of spring member A abruptly breaks the electric circuit without arcing. The circuit is not broken until the moment when the spring member A snaps into reverse curvature.

As the thermostat bar cools, after the breaking of the circuit, it straightens itself by moving up at the center (as viewed in Fig. 2), and the restoring connection 22 pulls the spring member A along with the bar until the tension of the spring member is such that it snaps back to initial position in firm pressure contact with button 21. The supporting frame 10 is preferably so constructed that the central portion 26 thereof acts as a positive stop for the bar B to prevent the same when cooling from being accidentally carried by its momentum out of contact with the spring member A after the circuit is closed.

The modification of Figs. 4 and 5 differs from the previously described construction in that the thermostat member B' is formed with inwardly curved ends b, so as to secure an effective greater length and consequently more pronounced movement (or tendency of movement) of the bar. In this instance, the supporting frame 10 is formed with a projection 27 arranged to act as a positive stop for the thermostat bar when it returns to normal position on cooling. The curved bar B' has this practical advantage over the straight bar B of Figs. 1 and 2: when the bar B' strikes the stop 27 on returning to normal position, and when it reaches the curved position shown in Fig. 5, any residual stresses in the bar can exhaust or equalize themselves by bending the curved ends, thus averting undue deformation of the bar. It may therefore be said that the curved ends b of bar B' act like resilient supports for the central portion of the bar. Otherwise, what has been said in connection with Figs. 1 and 2 is fully applicable to Figs. 4 and 5 without the need of repetition. Corresponding parts in the two constructions are indicated by the same reference characters.

It will be seen from the preceding description that I have provided a thermostat of exceedingly simple and compact structure, which can be made for a few cents. There are only two movable elements (the restoring connection 22 being part of one element), which are so compactly arranged that the entire instrument can be mounted in a very small space. The snap action of the bowed spring member A is positively controlled in either direction by a single thermostat member, which is so mounted that on cooling it cannot move beyond its normal position due to any residual internal stresses.

Although I have shown and described certain specific constructions, I want it clearly understood that my invention is not limited to the details set forth. Various changes will doubtless suggest themselves to the experienced builder without departing from the scope of the invention as defined in the following claims.

I claim as my invention:

1. A thermostat comprising a bowed spring member adapted to change its shape abruptly by external force, a thermostat bar supported at its ends and midway thereof normally engaging the central portion of said spring member, said thermostat bar being movable at its central portion under the action of heat to exert pressure against said bowed spring member until the latter snaps into a position of reverse curvature out of contact with said bar, and a connection between said spring member and said bar whereby the latter on cooling exerts pressure against said member until it snaps back to initial position.

2. A thermostat comprising a bowed spring member adapted to change its shape abruptly by external force, a thermostat bar supported at its ends and midway thereof normally engaging the central portion of said spring member, said thermostat bar being movable at its central portion under the action of heat to exert pressure against said bowed spring member until the latter snaps into a position of reverse curvature out of contact with said bar, and means mounted on the central portion of one of said elements and arranged to engage the other element when said thermostat bar cools, whereby the movement of the central portion of said bar on cooling exerts pressure against said spring member until the latter snaps back to initial position.

3. A thermostat comprising a bowed spring member adapted to change its shape abruptly by external force, a thermostatic element movable under the action of heat to exert pressure against said bowed spring member until the latter snaps into a position of reverse curvature out of contact with said element, means whereby said element on cooling presses against said member in the opposite direction until the latter snaps back to initial position, and a stop to prevent said element when cooling from being carried by its own momentum out of contact with said spring member.

4. A thermostat comprising a substantially U-shaped frame, a thermostat bar mounted at its ends on said frame, a bowed spring member supported on the legs of said frame and adapted to change its shape abruptly by external force, said thermostat bar and spring member being normally in pressure contact with each other at their central portions, the thermostatic movement of said bar under predetermined heat exerting pressure on said spring member until the latter snaps into a position of reverse curvature out of contact with said bar, and means whereby said bar on cooling presses against said spring member until the latter snaps back to initial position, said thermostat bar and spring member being movable in the plane of said supporting frame, whereby a flat compact structure is produced.

5. A thermostat comprising a substantially U-shaped frame, a thermostat bar mounted at its ends on said frame, a bowed spring member supported on the legs of said frame and adapted to change its shape abruptly by external force, said thermostat bar and spring member being normally in pressure contact with each other at their central points, the thermostatic movement of said bar under predetermined heat exerting pressure on said spring member until the latter snaps into a position of reverse curvature out of contact with said bar, means whereby said bar on cooling presses against said spring member until the latter snaps back to initial position, and a stop on said frame arranged to engage the central portion of said bar to prevent the same when cooling from accidentally moving out of contact with said spring member.

6. The combination of a thermostat bar having inwardly curved ends secured to a suitable support, the central portion of said bar being free to move under predetermined variations of temperature, a bowed spring member adapted to change its shape abruptly by external force, said spring member being normally in contact with the central portion of said bar, whereby said bar at predetermined high temperatures exerts pressure against said spring member until the latter snaps out of contact with said bar into a position of reverse curvature, and means whereby said spring member is snapped back to initial position when said bar reaches a predetermined low temperature.

7. A thermostat comprising a thermostat bar having inwardly curved ends secured to a suitable support, the central portion of said bar being free to move under predetermined variations of temperature, a bowed spring member adapted to change its shape abruptly by external force, the central portion of said spring member being normally in contact with the central portion of said bar, said thermostat bar at predetermined high temperature exerting pressure against the center of said spring member until the latter snaps into a position of reverse curvature out of contact with said bar, and means whereby said bar on cooling automatically snaps said member back to initial position.

8. In a thermostat, the combination of a substantially U-shaped support comprising a base member provided with a pair of legs, a thermostat bar secured at its ends to said support, a buckling spring mounted at its ends on the legs of said support, said bar and spring being arranged in the plane of said support to provide a flat compact structure, the center of said bar normally engaging the center of said spring so as to snap the same at predetermined high temperature into reverse curvature out of contact with the bar, and means whereby the bar on cooling exerts pressure against the spring until the latter snaps back to initial position.

9. In a thermostat, the combination of a substantially U-shaped support comprising a base member provided with a pair of legs, a thermostat bar secured at its ends to said support, a buckling spring mounted at its ends on the legs of said support, said bar and spring being arranged in the plane of said support to provide a flat compact structure, the center of said bar normally engaging the center of said spring so as to snap the same at predetermined high temperature into reverse curvature out of contact with the bar, means whereby the bar on cooling exerts pressure against the spring until the latter snaps back to initial position, and stop means on said support for preventing said bar when cooling from moving out of engagement with said spring after the latter has returned to initial position.

ADOLPH A. THOMAS.